United States Patent [19]

Paraskevakos

[11] 3,812,296

[45] May 21, 1974

[54] APPARATUS FOR GENERATING AND TRANSMITTING DIGITAL INFORMATION

[75] Inventor: Theodore G. Paraskevakos, Athens, Greece

[73] Assignee: Paraskevakos Electronics & Communication, Inc., Wilmington, Del.

[22] Filed: June 7, 1972

[21] Appl. No.: 260,511

Related U.S. Application Data

[63] Continuation of Ser. No. 76,436, Sept. 29, 1970, abandoned.

[30] Foreign Application Priority Data

Jan. 26, 1970 Greece ................................ 39092

[52] U.S. Cl. ................................ 179/18 B, 179/90 B

[51] Int. Cl. ................................ H04m 3/42

[58] Field of Search .......... 179/18 B, 18 BA, 18 BB, 179/90 B, 90 BB, 90 BD, 90 R

[56] References Cited

UNITED STATES PATENTS

| | | | |
|---|---|---|---|
| 3,206,554 | 9/1965 | Kandel et al. | 179/18 ET |
| 3,441,685 | 4/1969 | Wallace, Jr. | 179/90 B |
| 3,668,330 | 6/1972 | Hemdal | 179/18 ES |
| 3,436,477 | 4/1969 | Ghiringhelli | 178/26 |
| 3,702,902 | 11/1972 | Willis | 179/5 R |

*Primary Examiner*—Thomas W. Brown
*Attorney, Agent, or Firm*—Cushman, Darby & Cushman

[57] ABSTRACT

An apparatus for serially generating groups of electrical pulses, each group representing the value of a particular digit or ordinal place of a predetermined number such as the number of a calling telephone together with control digits and added information carrying digits for display or recording at a called telephone site. A number pulse generator repetitively and simultaneously produces a plurality of output pulse trains, each train representing one possible value of a digit. A priority determining unit also generates ordinal place signals sequentially representing a time for transmitting each sequential digit of the predetermined number and selected ones of the groups of electrical pulses are sequentially gated by the ordinal place signals to result in the desired serial transmission of groups of pulses respectively representing the predetermined number whenever such transmission is desired such as in response to a busy signal from the called telephone.

20 Claims, 9 Drawing Figures

INVENTOR
THEODOROS G. PARASKEVAKOS

BY Cushman, Darby & Cushman
ATTORNEYS

INVENTOR
THEODOROS G. PARASKEVAKOS

BY Cushman, Darby & Cushman
ATTORNEYS

INVENTOR
THEODOROS G. PARASKEVAKOS

Cushman, Darby & Cushman
ATTORNEYS

INVENTOR
THEODOROS G. PARASKEVAKOS
BY
Cushman, Darby & Cushman
ATTORNEYS

INVENTOR
THEODOROS G. PARASKEVAKOS

BY Cushman, Darby & Cushman
ATTORNEYS

INVENTOR

THEODOROS G. PARASKEVAKOS

BY Cushman, Darby & Cushman

ATTORNEYS

APPARATUS FOR GENERATING AND TRANSMITTING DIGITAL INFORMATION

This is a continuation, of application Ser. No. 76,436 filed Sept. 29, 1970, now abandoned.

This invention generally relates to apparatus for use in a telephone system and specifically to a completely electronic device for automatically transmitting information from a calling telephone to a called telephone.

It would often be advantageous to permit the transmission of information from a calling telephone to a called telephone such as for example when the called telephone is either busy or unanswered. If the transmitted information corresponds to a calling telephone number and if appropriate recording apparatus were included at the called telephone site, then it would be possible for the calling party to automatically leave a record of their telephone number with the called party. Other advantageous uses for such transmission of information may be readily called to mind by those skilled in the art.

For instance, such systems can be particularly beneficial in a variety of businesses, particularly small business concerns which presently employ answering services and the like. A system of this type connection to a print out mechanism may be employed in an entire telephone exchange or network of exchanges to provide a record of every telephone call made to each and every called subscriber. This record could include not only the number of the calling party, but also a designation of the type of telephone service from which the call is placed, e.g., whether the call is placed from a public telephone booth, from a business office, from a private home, or any other type of telephone service.

Systems of this nature could also be extremely beneficial in the field of criminology and law enforcement activities designed to protect citizens against kidnapping, extortion, etc. Finally, such systems represent a convenience feature that many persons would desire and appreciate from a telephone service, irrespective of the business or social benefit derived from such a system.

Systems for sending to the called party a signal representing the telephone number of the calling party have been recognized by the prior art as extremely desirable. Attempts have been made to provide such systems for a number of years, but the products of these prior art efforts have not met with much success. The systems known to the prior art generally rely on electro mechanical "apparatus" which involve an extreme amount of expense in the manufacture of the device and associated time for assembly of the devices into the average telephone exchange system. Accordingly, the prior art devices have not achieved the success that would initially be expected of such systems.

The most important reason for this lack of success is the expense involved with the provision of such a system. However, other detrimental factors associated with the prior art systems include the lack of reliability of the systems and the difficulty and nuisance attending frequent breakdowns of the equipment. The present invention overcomes many of the drawbacks of the prior art systems while achieving the broad objectives of such systems.

It is an object of this invention to provide completely electronic apparatus for transmitting such information without the disadvantages associated with the prior known electro mechanical systems.

It is a further object of this invention to provide an entirely electronic transmitting apparatus for transmitting pulse coded information over telephone lines wherein a large portion of the necessary electronic apparatus may be simultaneously utilized by a large number of telephone lines thus further reducing the necessary expense and complication of the resulting electronic circuitry.

It is yet another object of this invention to provide an entirely electronic apparatus for repetitively and serially generating groups of electrical pulses sequentially representing the ordinal places or digits of a predetermined number such as a telephone number for transmission on any one of a plurality of telephone lines.

This apparatus is intended for use with a recording device at the called telephone site similar to that described in my copending application Ser. No. 13,269, filed on Feb. 24, 1970. Other recording systems of this general type are known in the art and all require the interruption of the telephone circuit in a particular way or the transmission of a series of coded pulses over the telephone circuit to the recording device at the called telephone site.

It is yet another object of this invention to provide apparatus for generating a series of pulse trains for transmission to the called telephone site. Each of the pulse trains within the series will contain a number of pulses corresponding to the value of a particular digit of a predetermined number such as the telephone number of the calling telephone. If the pulse trains are properly chosen and sequentially transmitted to represent corresponding sequential digits of a predetermined telephone number then this series of pulse trains may be properly interpreted and recorded at the called telephone site to provide the necessary information.

Means for synchronizing the transmitting and receiving devices may also be included in the form of distinct synchronizing signals transmitted along with the pulse trains or by a more subtle device such as insuring that each of the pulse trains ends at a particular predetermined and common point irrespective of the value of the particular digit being transmitted. Or, conversely, by insuring that each of the pulse trains starts at a particular time irrespective of the particular digit value. Of course, other synchronizing schemes may also be employed such as merely leaving an abnormally long time between each of the individual pulse trains.

In any event, the receiving site must be able to differentiate each of the pulse trains, one from the other, and then to interpret the number of pulses contained in each of the sequentially transmitted pulse trains as representing a respective one of the ordinal place values of a predetermined number transmitted from the calling site.

A more complete understanding of this invention may be obtained by carefully studying the following detailed description in conjunction with the drawings in which like reference numerals denote like elements in each of the several views and of which:

Figure 1:
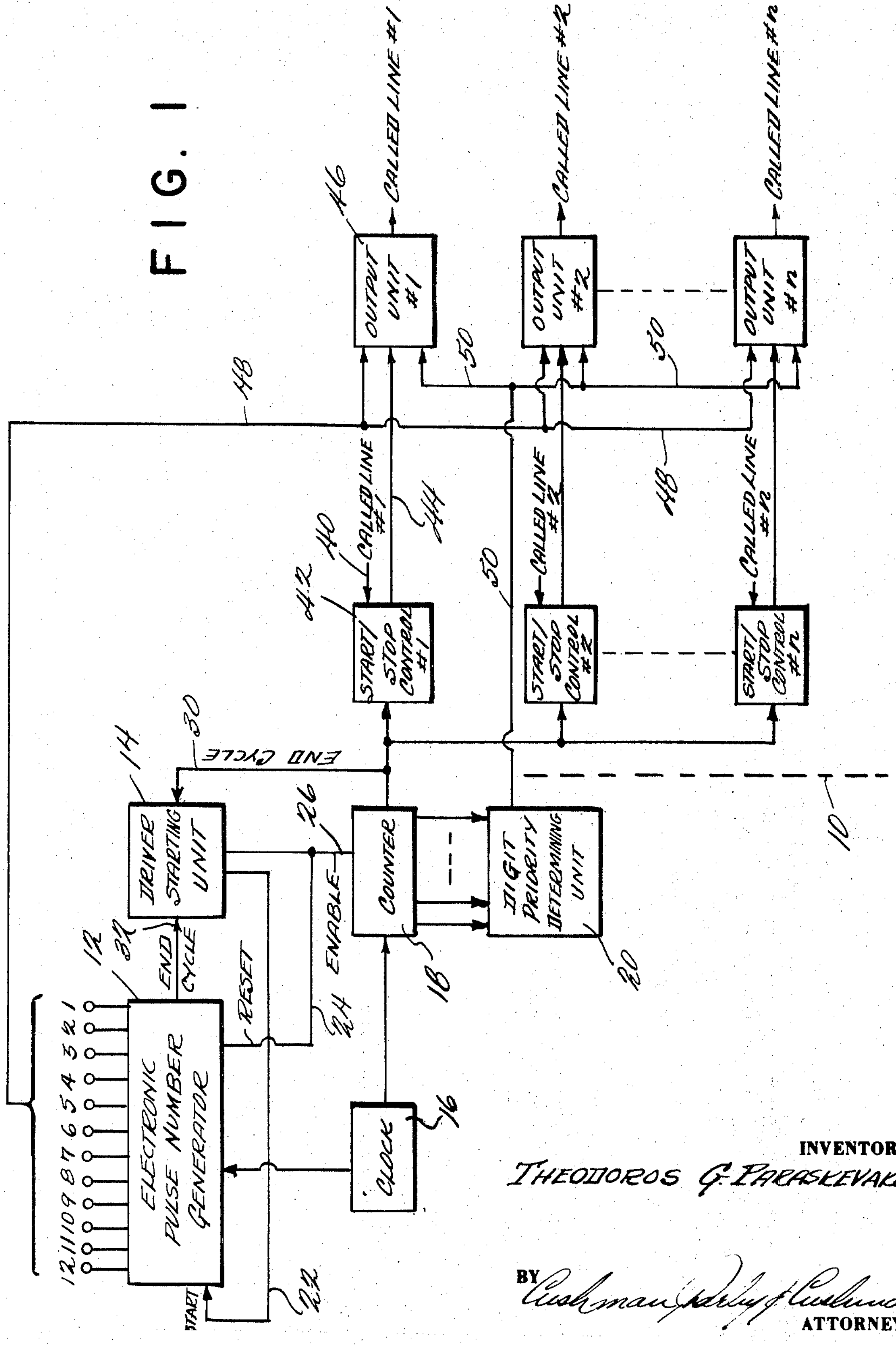
FIG. 1 is a block diagram of an exemplary embodiment of an overall system incorporating this invention.

Referring now more specifically to the exemplary system shown in FIG. 1, the apparatus to the left of dotted line 10 may be shared or commonly used by a great number (at least as many as 10,000) of individual calling and called telephone circuits. The apparatus to the right of dotted line 10 comprises a separate start/stop control unit 42 and an output unit 46 for each telephone circuit serviced in common by the apparatus to the left of dotted line 10.

As shown in FIG. 1, the shared apparatus to the left of dotted line 10 comprises an electronic pulse number generator 12, a driver starting unit 14, a clock 16, a counter 18, and a digit priority determining unit 20. All of this apparatus operates in a continuous repetitive manner and is driven by clock pulses from a common clock 16.

In response to a "start" signal on line 22 from driver starting unit 14, number generator 12 responds at the next clock pulse by producing an output pulse at terminal 12, but not at terminals 1 through 11. On the very next subsequent clock pulse, number generator 12 produces output pulses at both terminals 11 and 12 but not at terminals 1 through 10. Similarly, one more output terminal begins to function with each of the next succeeding clock pulses until, on the 12 clock pulse (counted from the start signal on line 22), all terminals 1 through 12 have an output pulse appearing thereon. Thus, the number generator 12 simultaneously produces a plurality of output pulse trains (a separate pulse train on each of the terminals 1 through 12), each pulse train representing one possible value for any particular digit of a number. For instance, the value of a digit 12 would be represented by the output pulse train from terminal 12 since that pulse train would comprise 12 pulses. Similarly, the digit value 11 would be represented by the pulse train at terminal 11 and the digit value 1 would be represented by the pulse train at terminal 1 comprising only one output pulse. Zero may be represented by the 10 pulses appearing at terminal 10, while the 11 and 12 pulse outputs may be used for control functions or for information transmission such as the identification of the calling telephone as a pay phone, etc.

Finally, after the appearance of an output pulse on terminal 1, the very next clock pulse from clock 16 will result in a "reset" signal on line 24 from driver starting unit 14 to reset number generator 12 to a non-active state where no output pulses are appearing on any of the terminals 1 through 12. Thus (as will be shown later in more detail), if a "start" signal on line 22 is repetitively generated after each "reset" signal on line 24, number generator 12 will repetitively and simultaneously produce the previously discussed plurality of output pulse trains with each individual train representing one possible value for the digit of a number.

While number generator 12 is useful in providing a plurality of output pulse trains for representing all of the possible values for any given digit of a particular number, additional means must also be provided for determining which particular ordinal place of the transmitted predetermined number is to be transmitted at any given instant in time. That is, there must be some priority means for determining the order of transmission of the pulse trains from number generator 12 such that the final series of pulse trains will respectively and sequentially represent the sequential digits of a particular predetermined number and thus be capable of providing the required meaningful output at a receiving terminal. This apparatus is shown in FIG. 1 as the digit priority determine unit 20 in conjunction with counter 18 and driver starting unit 14 and, of course, driven by the same clock pulses from clock 16 that are also used to drive number generator 12.

In the exemplary embodiment, the predetermined number of interest will be described as having 12 ordinal places. Thus, counter 18 must have at least 12 distinct states as, for instance, may be obtained by the use of at least four bistable stages in a binary digital counter. The counter 18 shown in FIG. 1 is, however, not utilized for counting all the clock pulses from clock 16. Rather, counter 18 is effective for counting clock pulses and thus changing its state only when it receives a proper "enable" signal on line 26 from driver starting unit 14. As shown in FIG. 1, this "enable" signal is taken from the same line which provides the "reset" signal on line 24 to number generator 12. Thus, counter 18 is only "enabled" to count an additional clock pulse at the end of each complete cycle of number generator 12.

Priority determining unit 20 comprises logic circuitry connected to counter 18 for sensing the instantaneous state of counter 18 and for producing a plurality of output signals on lines indicated at 50 to sequentially represent each of the ordinal places of the predetermined number having a total of 12 ordinal places (including control and information digits in addition to the usual telephone number) in the illustrative embodiment.

As will be more completely described below, when counter 18 completes a cycle of counting an "end cycle" signal on line 30 is transmitted to the driver starting unit 14 which works in a similar manner to the "end cycle" signal on line 32 (appearing on the next clock cycle after a pulse appears on the "1" terminal of number generator 12) from number generator 12 causing the counter to advance (by placing an additional "enable" signal on line 26) to its first state representing the first ordinal place of the predetermined number. Subsequently, a fresh "start" signal on the line 22 is generated to start the cycle of the number generator 12 all over again. At the end of this cycle, an "end cycle" signal on line 32 causes the driver starting unit 14 to produce another enable signal on line 26 thereby causing the counter 18 to advance to its second state and subsequently resulting in another "start" signal on line 22 to initiate a second complete cycle for number generator 12. This automatic sequential and repetitive action of the counter 18 and pulse number generator 12 is continued until all of the 12 ordinal places of the predetermined number (represented by sequential signals on line 50) have been transmitted, at which time the counter 18 rapidly advances through any remaining unused states until the beginning counter state, corresponding to the first ordinal place or digit, is reached whereupon another "start" signal is generated on line 22 to begin the whole process over again.

So far, the apparatus as described repetitively provides two groups of output pulse trains. One comes from the number generator 12 which repetitively and simultaneously produces a plurality of output pulse trains with each train representing one of the possible values of any given digit. The second comes from the priority determine unit 20 which produces another plurality of output pulses on lines 50 which respectively and sequentially represent the ordinal places of a predetermined number.

To utilize these two sets of pulse trains, individual output means (as shown to the right of dotted line 10 in FIG. 1) are provided for each of the telephone lines serviced by the common apparatus to the left of dotted line 10. Each of the output units is associated with a particular predetermined calling number which for the moment may be considered as connected through a switching apparatus to a particular called line. Each of the output means is preset in correspondence with the predetermined telephone number corresponding to the calling telephone number and includes logic means for sequentially gating particular pulse trains from number generator 12 in response to the sequential signals on lines 50 from priority determining unit 20 to sequentially represent ordinal places or digits of the predetermined number.

A starting signal corresponding to "busy" signal on the called line or an unanswered called telephone may be introduced at 40 to start/stop control unit 42 which in turn causes a signal to appear on line 44 to a corresponding output unit 46 thus permitting output unit 46 to respond to the repetitive and sequential signals always present at lines 48 and 50 from number generator 12 and priority determine unit 20. Thus, when enabled by a signal on line 44, a particular output unit 46 is caused to transmit groups of pulses sequentially representing the digits of a particular predetermined number corresponding to the particular predetermined number corresponding to the particular preset condition of the output unit 46.

As shown in FIG. 1, a plurality of output units and start/stop control units are utilized in a complete system with a pair of such units being provided for each serviced telephone circuit.

Of course, the output pulses from the output units 46 may be used to operate a relay or other means to interrupt the telephone circuit if the recording apparatus requires this. Actual transmission of the output electrical pulses along the telephone circuit may also be utilized in order to transmit the desired information to the called telephone site.

Figure 2:
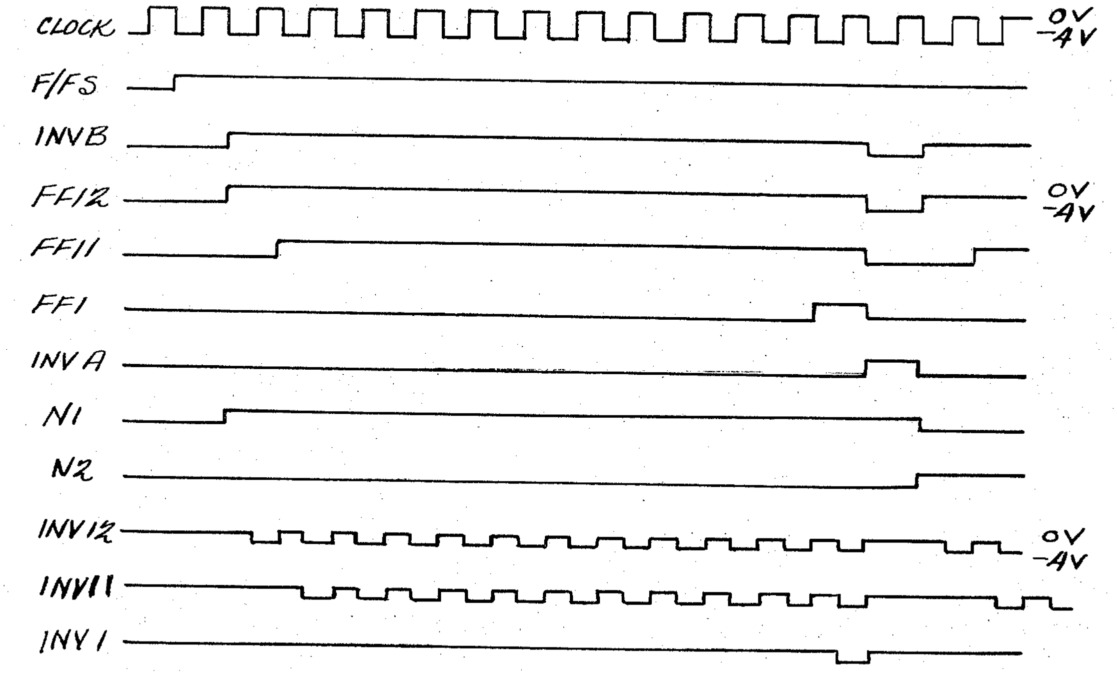
FIG. 2 is a graph of several electrical waveforms present at selected points in the system of FIG. 1.

Briefly, referring now to FIG. 2, some of the waveforms shown therein have already been implicitly explained and will therefore be meaningful at this point. For instance, the clock pulses shown at the top of FIG. 2 represent the output from clock 16 while the signal represented by F/FS represents a signal on line 44 requesting the transmission of information on a particular one of the serviced telephone lines.

The waveforms represented at N1 and N2 represent two of the signals on lines 50 from priority unit 20 wherein N1 is "on" for a length of time corresponding to 12 cycles of clock pulses. As soon as N1 turns "off," a signal appears on line N2 of lines 50 which follows N1 in a sequence corresponding to the desired transmission sequence of digit values in the system. Of course, during the time N1 is "on," number generator 12 goes through a complete cycle and the output appearing on terminal 12 in FIG. 1 is shown as INV12 in FIG. 2 where 12 output pulses are shown during the time N1 is "on." Other outputs are shown for terminals 11 and 1. Likewise, when N2 is "on" a similar complete cycle of number generator 12 will occur and the first portion of that complete cycle is shown at the extreme right in FIG. 2. Other waveforms shown in FIG. 2 will be meaningful only after a discussion of the detailed circuitry used in the exemplary embodiment.

Figure 3:
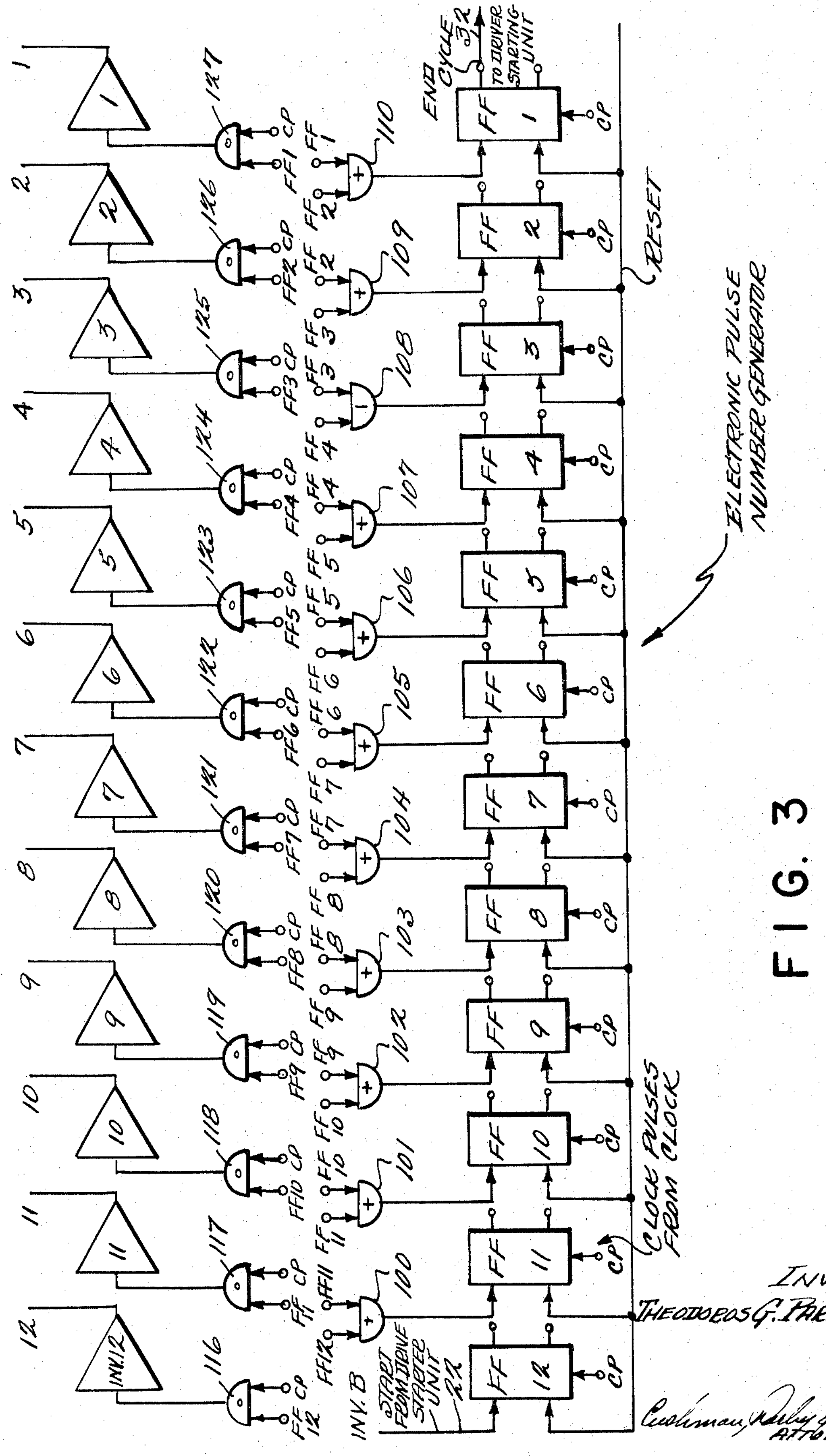
FIG. 3 is a more detailed block diagram of an exemplary embodiment of an electronic pulse number generator which may be used in the system of FIG. 1.

Referring now to FIG. 3, the electronic pulse number generator 12 of FIG. 1 is shown in more detail. In essence, the number generator comprises a series of flip-flops FF12, FF11 . . . FF1 and associated logical input gates which primarily involve logical combinations of outputs from the various flip-flops. In addition, the number generator also includes a series of inverters INV12, INV11 . . . INV1 together with associated input logic circuitry which combines outputs from the various flip-flops with clock pulses CP from clock 16. The generator output terminals 12 through 1 shown in FIG. 1 are shown here as the outputs of inverters INV12 through INV1 respectively.

A "reset" signal from line 24 is shown as connected to one input of each of the 12 flip-flops FF12 through FF1 to simultaneously reset all of the flip-flops to a particular one of their bistable states. For instance, reset line 24 may be connected to all of the "0" inputs of the various flip-flops to simultaneously set all the flip-flop outputs to "0" in response to a "reset" signal on line 24.

As shown in FIG. 3, the start signal on line 22 is connected to one of the inputs of FF12, for example the "1" input. Clock pulses CP are also introduced into each of the flip-flops and the actual transition from one stable state to the other occurs in response to these clock pulses as is well known in the art. Thus, after a start signal on line 22 is applied, the next clock pulse shifts flip-flop FF12 to a "1" output which is then transmitted to the input of the next succeeding flip-flop FF11 through "OR" gate 100 such that on the occurrence of the next clock pulse FF11 is also shifted to the "1" state.

Although the output of FF12 should retain its "on" or "1" output condition since the "start" signal on line 22 is maintained until a "reset" signal appears on line 24, to insure against accidental resetting of FF11, the output from FF11 is also admitted through "OR" gate 100 to the input of FF11 thereby providing a selflatching circuit to maintain FF11 with a "1" output until a "reset" signal is received on line 24.

The remaining flip-flops FF10 through FF1 are similarly and sequentially linked through "OR" gates 101, 102, 103, 104, 105, 106, 107, 108, 109 and 110. The output from FF1 also provides the "end cycle" signal on line 32 to the driver starting unit as previously discussed.

As shown in FIG. 2, the output FF12 comprises a series of output pulses, each output pulse being equal in length to 12 clock pulse cycles. Similarly, the output FF11 corresponds to a series of pulses having a length equal to 11 clock pulses and FF1 has a length corresponding to one complete clock pulse cycle. All of the output signals FF12 through FF1 terminate a common point in time determined by a common "reset" signal on line 24.

Each of these outputs FF12 through FF1 is then combined in "AND" gates 116, 117, 118, 119, 120, 121, 122, 123, 124, 125, 126, and 127, respectively with clock pulses CP. The output from these "AND" gates is presented to inverters INV12 through INV1 respectively to provide the previously discussed pulse trains having 12, 11, 10, nine, eight, seven, six, five, four three, two and one output trains, respectively, with coincident terminal pulses in each of the trains occurring on terminals 12 through 1 respectively.

The output from INV12, INV11 and INV1 have been previously discussed with respect to FIG. 2. The "start" signal on line 22 corresponds to waveform INVB shown in FIG. 2 as the third waveform from the top. The "reset" signal on line 24 corresponds to INVA also shown in FIG. 2. It should be noted that the "start" signal on line 22 and the "reset" signal on line 24 are related to one another in that each is the inverse of the other.

Figure 4:
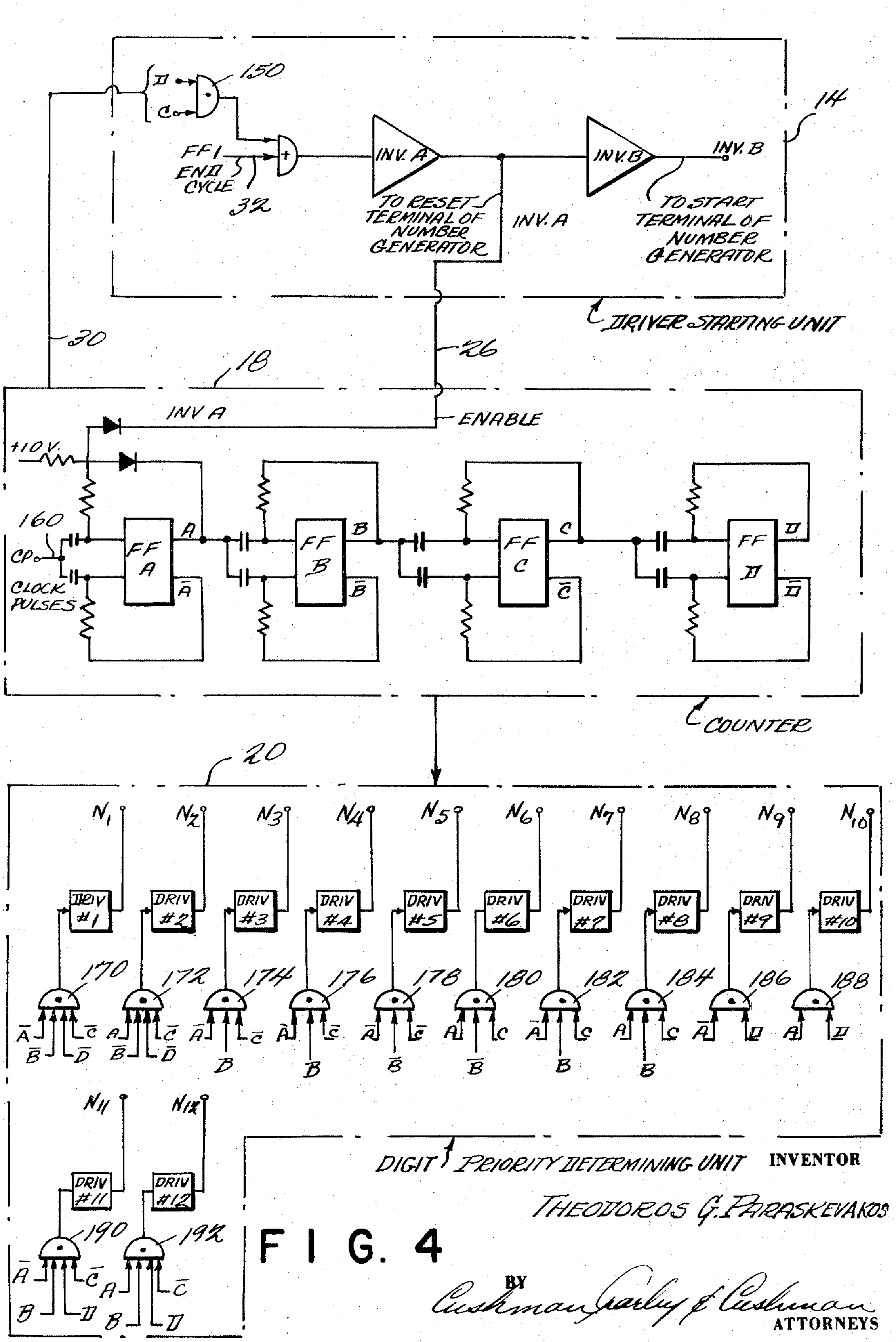
FIG. 4 is a more detailed block diagram of an exemplary driver starting unit, counter and priority determining unit which may be utilized in the system of FIG. 1.

The driver starting unit 14 is shown in more detail in FIG. 4. In essence, this unit comprises an inverter INVA and another inverter INVB together with input logic circuitry comprising "AND" gates 150 and 152 together with "OR" gate 154. The "end cycle" signal on line 32 corresponding to the output from FF1 is directly input to "OR" gate 154 while the "end cycle" signals on lines 30 corresponding to particular states of counter 18 are first combined in "AND" gates 150 and 152 in a particular manner that will be more apparent after the following discussion.

Whenever an "end cycle" signal is present at the input to "OR" gate 154, INVA is turned "on" while INVB is turned "off." Thus, the output from INVA may be used as a "reset" signal on line 24 for number generator 12 (as previously discussed) while the output from INVB may be utilized for a "start" signal on line 22 to pulse number generator 12 (as has also been previously discussed). The waveforms of INVB and INVA have already been discussed with respect to FIG. 2 and the operation of the driver starting unit should be apparent to those skilled in the art.

The counter 18 is shown in FIG. 4 as a typical binary digital counter comprising four individual flip-flop elements FFA, FFB, FFC and FFD connected together in a counting circuit. Normally, the input clock pulses at 160 would cause the counter to advance by one additional distinct state (through each of its 16 possible states) in a repetitive fashion each time a clock pulse is received on line 160. However, FFA is normally biased in such a way that the clock pulses are ineffective to cause flip-flop FFA to shift from one state to the other unless an "enable" signal on line 26 is present. As shown in FIG. 4, the enable signal on line 26 is actually the output from INVA in the driver starting unit 14 and thus the "enable" signal for the counter corresponds to the "reset" signal for number generator 12.

Finally, the priority determine unit 20 is also shown in FIG. 4. In essence, the priority determine unit comprises 12 drivers, the outputs of DRIV No. 1 through DRIV No. 12 respectively corresponding to outputs $N_1$, $N_2$, $N_3$, . . . $N_{12}$ which represent the 12 ordinal places or digits of a predetermined telephone number plus control and/or extra inforamtion digits in this exemplary embodiment. Each of the drivers has an input gate 170, 172, 174. . . 192 which utilize as inputs, the outputs from flip-flops FFA, FFB, FFC and FFD (or their inverted outputs).

Thus, the output from each of the "AND" gates 170 through 192 respectively corresponds to a particular distinct state of counter 18. For instance, an output will appear from gate 170 only when all of the flip-flops in counter 18 are "off" corresponding to particular distinct state of the counter and thus driving DRIV No. 1 and producing a signal at terminal $N_1$ corresponding to the time for transmitting a first digit of the predetermined number.

Subsequently, the next distinct state of counter 18 is represented by an "on" condition of FFA and an "off" condition of the remaining flip-flops in counter 18. Thus, as shown in FIG. 4, "AND" gate 172 will have an output when the counter changes to this specific distinct state while none of the other "AND" gates have inputs corresponding to that same state. Thus, the output from gate 172 and from DRIV No. 2 on terminal $N_2$ corresponds to the time for transmitting a second digit of the predetermined number. A similar analysis holds with respect to the remaining 10 "AND" gates 174, 176, 178 . . . 192 and drivers shown in priority determine unit 20 in FIG. 4. Since counter 18 has in fact 16 distinct states, the exemplary embodiment could be used to transmit predetermined numbers up to 16 digits or ordinal places in length. However, as described below, only 12 of the distinct states of counter 18 are actually utilized in this exemplary embodiment for transmitting digits. The remaining four unused counter states are effectively bypassed by holding the enable signal on line 26 "on" (and thus the "reset" signal on line 24 to number generator 12) for four consecutive clock cycles thus permitting the counter 18 to quickly cycle through the four unused distinct states to ready the apparatus for another repetitive cycle.

The means for insuring this quickened cycling of counter 18 through the unused counter states comprises "AND" gate 150 in driver starting unit 14. As shown in FIG. 4, the uninverted output from FFC and FFd are combined in "AND" gate 150. Thus, any counter state corresponding to an "on" condition of FFC and FFD will cause a continuing "reset" and "enable" signal from unit 14.

As shown in FIG. 4, the input to "AND" gate 150 comprises the output from flip-flops FFC and FFD. The mechanism involved will be readily apparent if one considers for a moment the 16 successive states of counter 18.

If the uninverted outputs A, B, C and D from flip-flops FFA through FFD respectively by the usual numerals "0" and "1," and a starting point where all the four flip-flops are in an "off" condition is assumed, the successive states of the counter stages are shown as follows with the corresponding associated ordinal digit of the predetermined number being indicated in parenthesis: 0000(1); 1000(2); 0100(3); 1100(4); 0010(5); 1010(6); 0110(7); 1110(8); 0001(9); 1001(10); 0101(11); 1101(12); 0011(none); 1011(none); 0111(none) 1111(none). The four counter states to be disregarded 0011, 1011, 0111 and 1111 will be bypassed since the outputs from flip-flops FFC and FFD will be combined in "AND" gate 150 to provide an "end cycle" signal through "OR" gate 154 thus producing a "reset" and "enable " signal at the output from INVA and thus causing the counter to cycle past these four states.

Figure 5:
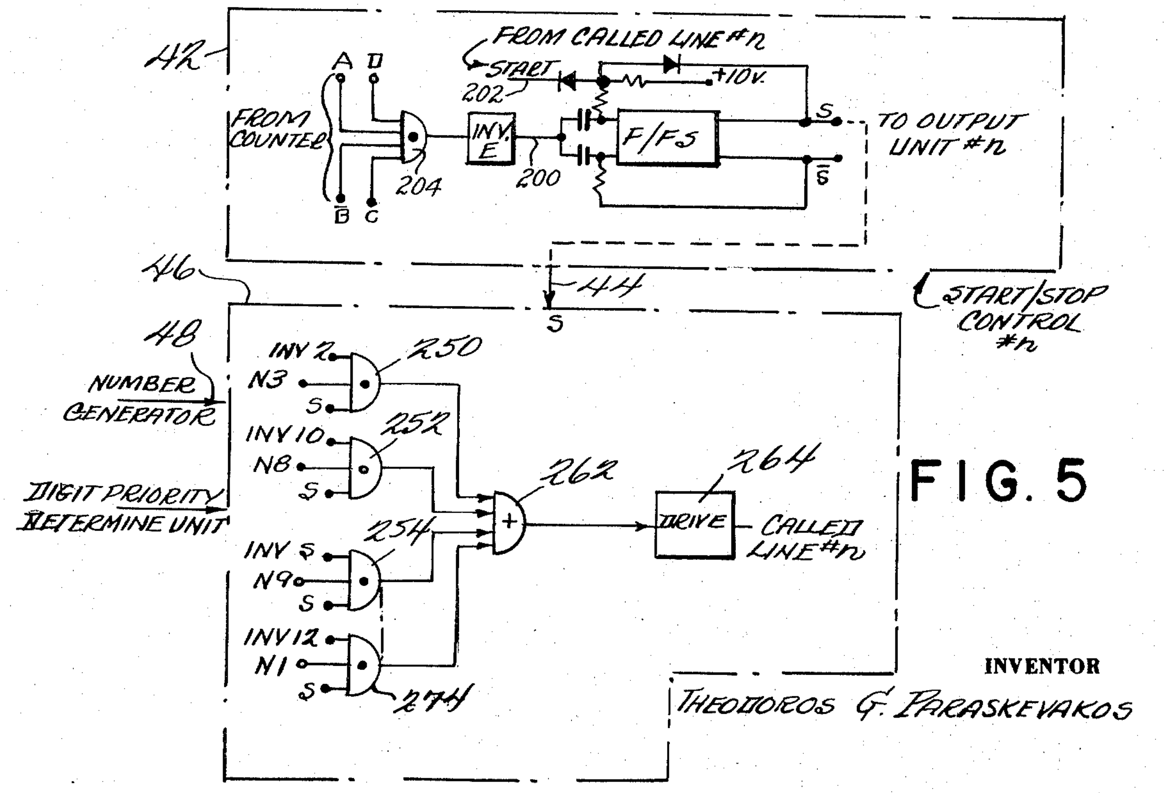
FIG. 5 is a more detailed block diagram of an exemplary embodiment for a start/stop control and for an output unit for a single telephone line in the system of FIG. 1.

The start/stop control units 42 and output units 46 shown in FIG. 1 are shown in more detail at FIG. 5. Throughout the following discussion, is should be kept in mind that the apparatus shown in FIG. 5 is repeated for each of the tlephone lines serviced by the apparatus of this invention.

The start/stop control unit 42 comprises a flip-flop FFS having non-inverted output S and an inverted output $\bar{S}$. Normally, flip-flop FFS is insensitive to any input on line 200 coming from inverter INVE. However, this biased input against response or change of state may be altered by a "start" input on line 202 originating from a called line associated with this particular start/stop unit. For instance, the "start" signal on line 202 may be generated automatically in response to a busy signal coming from a called line or a failure to answer a ringing signal sent from the calling telephone site to the called telephone site.

As previously discussed, the starting time point for the first ordinal place of the predetermined number corresponds to a state 0000 of counter 18. In order to start the serial transmission of pulse trains corresponding to the digits of predetermined number at a proper starting point, the output means 46 must be enabled or sensitized as previously discussed by a signal on line 44 from unit 42 at a proper point just prior to the starting of another complete cycle of the priority determining unit 20.

As shown in the illustrative embodiment in FIG. 5, this is conveniently accomplished by combining the outputs of flip-flops FFA through FFD in "AND" gate 204 such that an output from "AND" gate 204 occurs sometime during the "dead time" in which counter 18 is being quickly cycled through the four unused counter states. As shown in FIG. 5, this occurs for counter state 1011 which is just two states removed from the beginning point of 0000. Accordingly, whenever a start signal from the called telephone line on line 202 is present, flip-flop FFS will be enabled to flip upon the next signal from line 200 which will occur the next time counter state 1011 occurs just prior to another complete cycle of priority determining unit 20. When this finally occurs, an output signal from flip-flop FFS is transmitted along line 44 to a corresponding output unit 46.

The output unit 46 is also connected to the number generator by lines 48 and to the priority determine unit by lines 50. Unit 46 essentially comprises a plurality of "AND" gates 250, 252, 254 . . . through 274 (one for each of the 12 ordinal places or digits of the predetermined number) with the outputs from each of these "AND" gates being combined in "OR" gate 262 before amplification by driver 264 for ultimate transmission at the output of driver 264 on the called line for recording at the called telephone site.

Thus, as shown in FIG. 5, the output $N_1$ from the priority determining unit is combined in "AND" gate 274 with an enable signal S from start/stop control unit 42 and a pulse train comprising 12 pulses from the output of INV12 (corresponding to a digit value of 12 for the first ordinal place of a particular predetermined number) is output from driver 264 during the time internal for transmitting the first digit as indicated by $N_1$. Corresponding analysis for each signal $N_1$ through $N_{12}$ shows that for the example shown in FIG. 5, the value of the third ordinal place or digit equals 2; the value of the eighth ordinal place or digit equals 10 and the value of the ninth ordinal place equals 5, etc. Thus, as the counter now cycles from state 0000 consecutively through state 1101 the 12 digit values for the 12 place predetermined number are sequentially transmitted over the called telephone line as a series of pulse trains, each train having a number of pulses representing a particular value for that particular ordinal place of the predetermined number. The next time counter state 1011 occurs corresponding to an output from "AND" gate 204, the output from inverter E on line 200 will cause flip-flop FFS to turn "off" thus inhibiting any further transmission from output unit 46 since the enabling signal S is no longer present at each of the "AND" gates 250, 252, 254 . . . 274.

Thus, a complete cycle of operation involves receiving a "start" signal from the called line on line 202 at a particular start/stop control unit 42 which in turn causes the transmission of an enabling signal S on line 44 the next time counter state 1011 is attained in counter 18. Subsequently, the corresponding output unit 46 is enabled to sequentially transmit groups of pulse trains corresponding to the digital values of the ordinal places of a predetermined telephone number (preset in output unit 46 by a particular connection of outputs from number generator 12 and priority determining unit 20 in "AND" gate 250 through "AND" gate 274 and finally terminating the next time counter state 1011 is sensed by "AND" gate 204.

For each of the subscribers of a particular telephone exchange, an individual output unit 46 is provided, and for purposes of explanation, the above exemplary description has been given assuming the additional presence of one flip-flop FFS for each of the subscribers. In reality, the functions of start/stop control unit 42 may be performed with only one flip-flop FFS for each first stage of a telephone exchange, thus saving a large number of circuits as will be apparent to those skilled in the art. Such an individual driver in the first stage of a telephone exchange has a number of two leg input "AND" gates with the number of such gates depending on the particular requirements of the telephone exchange under consideration as will be apparent to those skilled in the art.

Figure 6:
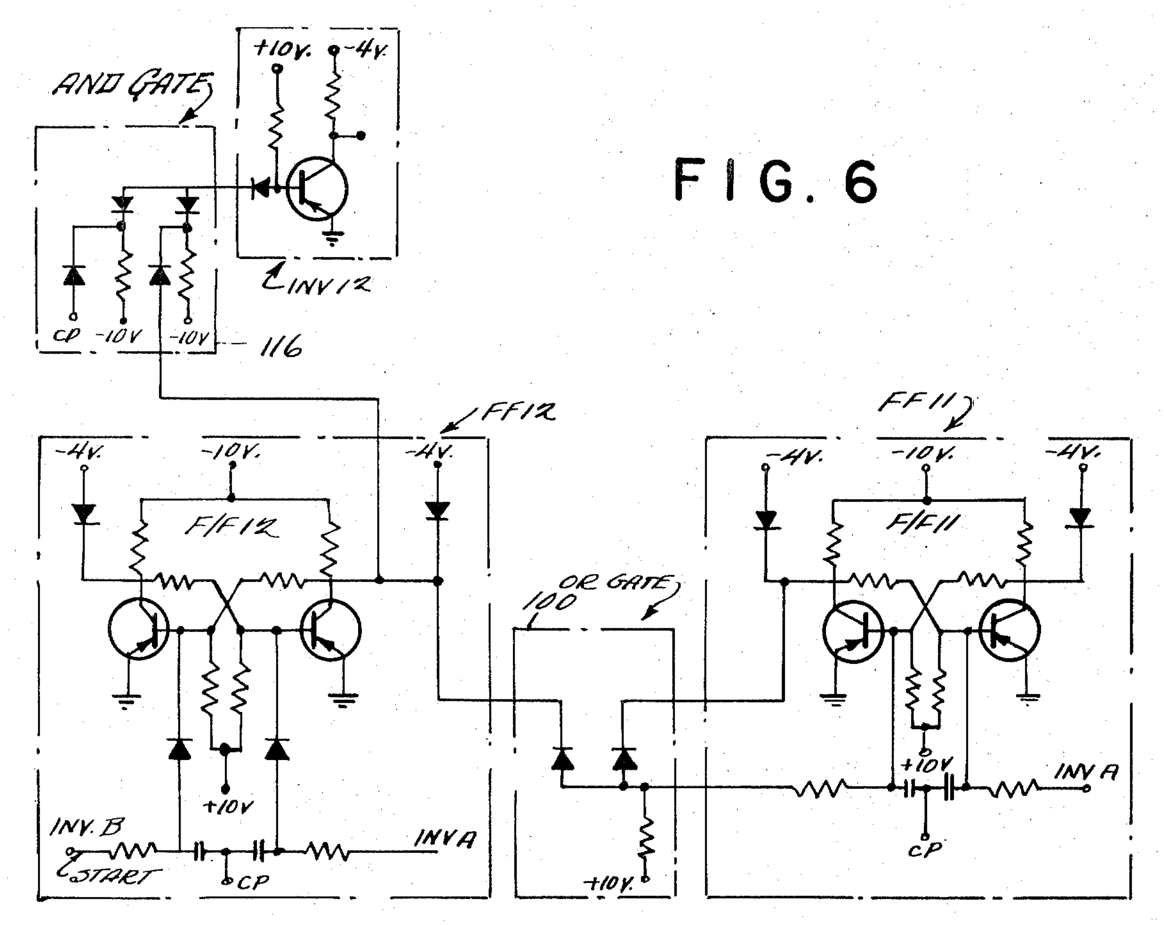
FIG. 6 is an electrical circuit diagram detailing typical exemplary circuits which may be used in the blocks shown in FIG. 3.

A typical detailed electrical circuit for use in the number generator of FIG. 3 is shown in FIG. 6. The "AND" gate 116 and "OR" gate 100 as well as inverter INV12 and flip-flops FF12 and FF11 are shown in detail. The operation of these circuits is obvious to one skilled in the art and is shown only for purposes of illustration and therefore will not be further discussed.

Figure 7:
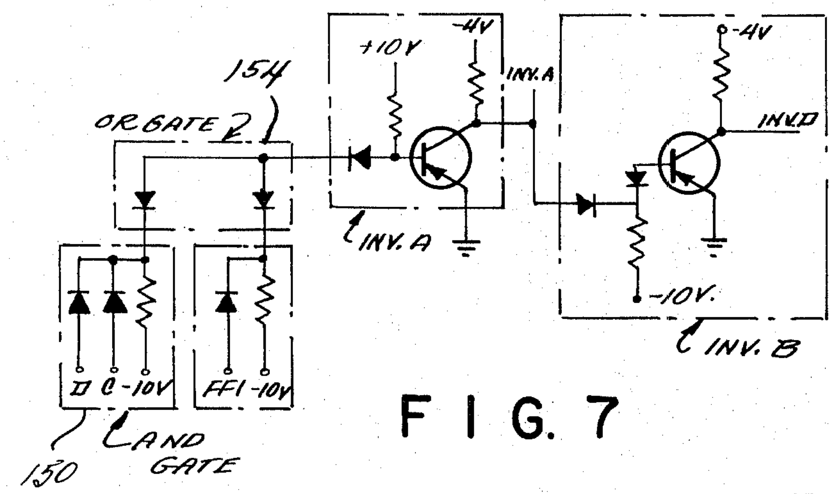
FIG. 7 is a detailed circuit diagram for a typical exemplary circuit which may be used in the blocks shown for the driver starting unit in FIG. 4.

Similarly, the specific electrical circuitry shown in FIG. 7 is a typical circuit which may be used in the driver starting unit 14 shown in FIG. 4. "OR" gate 154 and "AND" gate 150, as well as inverters INVA and INVB are shown only for purposes of illustration. It will be readily appreciated by those skilled in the art that there are many other circuits which could be just as easily used in the apparatus previously described.

Figures 8, 9:
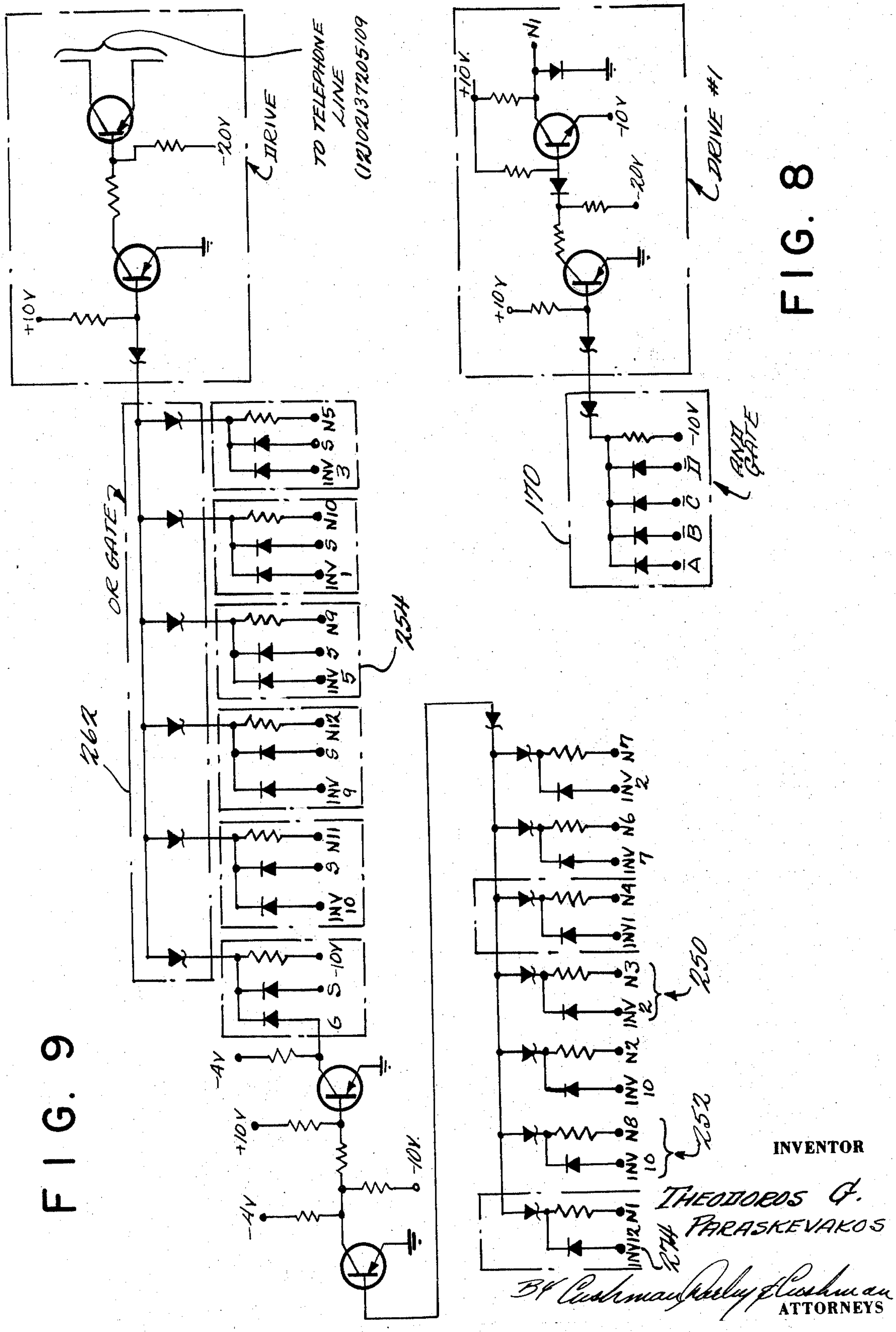
FIG. 8 is a detailed electrical circuit diagram for a typical exemplary circuit which may be used in the blocks shown in the priority determine unit in FIG. 4.
FIG. 9 is a detailed electrical circuit of a typical exemplary circuit which may be used in the blocks shown for the output unit in FIG. 5.

In a similar manner, the specific electrical circuitry shown in FIG. 8 may be used in the priority determine unit 20 shown in FIG. 4. Here, "AND" gate 170 and DRIV No. 1 are shown in detail. The operation of this circuit will be readily appreciated by those skilled in the art and no detailed explanation is believed to be necessary. It will also be readily appreciated by those skilled in the art that other equivalent circuitry may be readily substituted for that shown in FIG. 8.

The specific circuitry shown in FIG. 9 may be used for the output unit 46 shown in FIG. 6. As shown in FIG. 9, such an output unit may in fact comprise a series of two legged gates such as gate 250 which drive an intermediate driver which is, in turn, connected to one of a series of three legged gates such as 254, where the enabling signal S is thus effectively combined with all the previous two legged gates prior to the intermediate driver. Alternatively, a plurality of all three legged "AND" gates could, of course, be used. The operation of the circuit of FIG. 9 will be apparent to those skilled in the art and thus no further discussion is necessary. As shown in FIG. 9, this particular output unit is preset to transmit the predetermined number (12)02137205109 representing a 12 digit number including a control digit (i.e., value 12), an area code (i.e., 021) an information code (i.e., 3, indicating a pay phone) and a seven digit phone number (i.e., 720–5109).

Although only one embodiment of this invention has been specifically described in the foregoing specification, it will be obvious to those skilled in the art that many modifications of the disclosed apparatus are possible while yet retaining all of the significant functions and hence operation of the overall apparatus as described above. For instance, integrated circuits could easily be substituted for many of the discrete element circuits shown in the illustrative embodiment. Accordingly, all these modifications are intended to be included within the scope of this invention.

What is claimed is:

1. An apparatus for serially generating groups of electrical pulses sequentially representing the ordinal places or digits of a predetermined number or other data for transmission on any one of a plurality of telephone lines, said apparatus comprising:

pulse generator means for repetitively and simultaneously producing a plurality of output pulse trains, each train representing one possible value of one of said digits, priority determining means for producing ordinal place signals sequentially representing a time for transmitting pulse trains representing each ordinal place of said predetermined number, and an output means for each of said telephone lines which is connected to said pulse generator means and to said priority determining means and which is present in correspondence with said predetermined number to permit passage of a predetermined particular one of said pulse trains in response to each of said ordinal place signals thereby generating groups of pulses sequentially representing the digits of said predetermined number.

2. An apparatus as in claim 1 including a clock means for producing electrical clock pulses to drive said pulse generator means and said priority determining means.

3. An apparatus as in claim 2 for use with a source of clock pulses wherein said pulse generator means comprises:

a plurality of serially connected flip-flops for sequentially flipping to a predetermined stable state and remaining thereat in response to sequential clock pulse from said source of clock pulses, an "AND" gate having at least two inputs and an output respectively associated with each of said flip-flops, one of said "AND" gate inputs being connected to at least one output of its respectively associated flip-flop for producing a gating input to the "AND" gate whenever its associated flip-flop is in said predetermined stable state, and the other of said "AND" gate inputs being connected to said source of clock pulses thereby providing a train of clock pulses at the "AND" gate output whenever said gating signal is present from its respectively associated flip-flop.

4. An apparatus as in claim 3 wherein:

each of said flip-flops includes a first and a second input terminal for causing the associated flip-flop output to take on a respectively corresponding one of first and second stable states upon the next clock pulse occurrence, said first input of the first of said serially connected flip-flops being connected to a start terminal for beginning a complete cycle of said sequential flipping, and an output of the last of said serially connected flip-flops being connected to an end cycle terminal for signaling the end of said complete cycle.

5. An apparatus as in claim 4 including a reset line commonly connected to all of said second inputs of said plurality of flip-flops for simultaneously resetting all of said flip-flops to said second stable state upon the next clock pulse occurrence.

6. An apparatus as in claim 1 wherein said pulse generator produces one complete cycle of output pulse trains in response to a start signal and produces an end cycle signal upon the completion of said complete cycle, said apparatus further including a driver starting unit comprising:

input means for receiving said end cycle signal, first inverter means having an output and having an input connected to said input means, second inverter means having an output and having an input connected to the output of said first inverter, the output from said first inverter being effective for use as a reset signal for resetting said pulse generator to an inactive state characterized in the absence of output from said pulse generator, and the output from said second inverter being effective for use as said start signal.

7. An apparatus as in claim 1 for use with a source of clock pulses wherein said priority determining means comprises:

a digital counter having a plurality of binary stages for counting pulses input thereto, said counter being connected to said source of clock pulses but being normally inhibited from counting in response to said clock pulses unless an enabling signal is also present, and a plurality of logic gates, each having an output and at least one input connected to at least one of said binary stages for generating said sequential ordinal place signals at outputs of said logic gates in correspondence with sequential changes in the contents of said digital counter.

8. An apparatus as in claim 7 including means for resetting said pulse generator to a non-active state at the end of a complete cycle of said output pulse trains and wherein said means is also effective to simultaneously produce said enabling signal for said digital counter.

9. An apparatus as in claim 1 wherein said means comprises:

a starting unit for producing an output request signal, a plurality of "AND" gates with inputs operatively connected to said output request signal, to select predetermined ones of said output pulse trains from said pulse generator means and to select predetermined ones of said ordinal place signals, said selected output pulse trains and said selected ordinal place signals being chosen to represent digit values of said predetermined number, and "OR" gate means for effectively combining the gated outputs from all of said "AND" gates onto a single output line.

10. An apparatus as in claim 9 wherein said starting unit comprises:

a flip-flop which normally does not change its state unless enabled by a start signal, and input means connected to said priority determining means for sensing the incipient beginning of a cycle of said ordinal place signals, for causing said flip-flop to change states and produce said output request signal if said start signal is present and for causing said flip-flop to change states and remove said output request signal at the next sensing of said incipient beginning.

11. Pulse train generating and selection apparatus for use in a central telephone exchange which is connected to a plurality of subscribing telephone lines whereby successive digits or characters of predetermined data values that are associated with any particular subscriber's calling line may be automatically transmitted as corresponding successive electrical pulse trains to a connected called telephone line, said pulse train generating and selection apparatus comprising:

centralized pulse train generating means for automatically and successively generating a plurality of electrical pulse trains representing all possible values of said predetermined data to be transmitted, and further means including a pluraity of output units, each output unit being associated with one corresponding subscriber's telephone line and also being connected to said centralized pulse train generating means, said further means automatically selecting and routing a particular predetermined sequence of said pulse trains representing the predetermined data values to a selected called telephone line.

12. Transmitting apparatus for use in a central telephone exchange to transmit electrical pulses representing successive digits or characters of predetermined data values to a called telephone site, said transmitting apparatus comprising:

means for automatically and simultaneously generating electrical pulse trains representing all possible data values to be transmitted, each pulse train corresponding to a separate channel, and further means including a plurality of output means connected to said first-mentioned means and corresponding to a like plurality of telephone lines in said central exchange, said further means automatically and successively routing selected ones of said pulse trains, which trains correspond to said successive digits or characters of the predetermined data values, to an appropriate called telephone line.

13. Transmitting apparatus for use in a central telephone exchange to transmit electrical pulses representing successive digits or characters of predetermined data values to a called telephone site, said transmitting apparatus comprising:

means for automatically generating electrical pulse trains representing all possible data values to be transmitted, each pulse train corresponding to a separate channel, further means including a plurality of output means connected to said first-mentioned means and corresponding to a like plurality of telephone lines in said central exchange, said further means automatically and successively routing selected ones of said pulse trains, which trains correspond to said successive digits or characters of predetermined data values, to an appropriate called telephone line, and said first-mentioned means comprising a pulse generator having a different output terminal for each possible data value and including means for repetitively and simultaneously producing electrical pulse trains on each of said output terminals.

14. Transmitting apparatus for use in a central telephone exchange to transmit electrical pulses representing successive digits or characters of predetermined data values to a called telephone site, said transmitting apparatus comprising:

means for automatically generating electrical pulse trains representing each possible data value, further means including a plurality of output means connected to said first-mentioned means and corresponding to a like plurality of telephone lines in said central exchange, said further means automatically and successively routing selected ones of said pulse trains, which trains correspond to said successive digits or characters of predetermined data values, to an appropriate called telephone line, said first-mentioned means comprising a pulse generator having a different output terminal for each possible data value and including means for repetitively and simultaneously producing electrical pulse trains on each of said output terminals, each of said output means including a plurality of gating means each corresponding to one of said digits or characters for passing electrical signals in response to being enabled, said output terminals being selectively connected to each of said gate means in correspondence with the predetermined data values represented thereby, and said first-mentioned means include priority determining means connected to each of said gating means for sequentially enabling said gates in a predetermined order whereby said successive digits or characters of predetermined data values are accurately represented as sequential groups of electrical pulse trains on the selected called telephone line.

15. Transmitting apparatus as in claim 14 further comprising a common clock means for synchronously driving both a pulse train generating section of said first-mentioned means and said priority determining means.

16. Transmitting apparatus as in claim 14 further comprising:

start/stop means connected to all the gate means in a respectively associated output means for insuring that said gate means are enabled only when a called line is actually connected thereto and then only for complete transmission cycles during which all of said successive digit or character data values are transmitted whereby an incomplete transmission beginning in the midst of a string of data values is prevented.

17. In a telephone central exchange, centralized transmitting apparatus associated with a plurality of incoming subscriber's telephone lines in the exchange for successively transmitting a plurality of electrical pulse trains representing a predetermined plurality of predetermined data values over called telephone lines, said centralized transmitting apparatus comprising:

centralized pulse train generating means for automatically generating a plurality of electrical pulse trains corresponding to all possible predetermined data values to be transmitted, and further means including an outputting unit for each of said plurality of incoming telephone lines, each of said outputting units being connected to said centralized pulse train generating means, to a respectively associated calling or incoming telephone line and to central exchange switching equipment which will cause eventual connection to a selected called telephone line, and said further means including gating means connected for successively routing predetermined ones of said electrical pulse trains to said called telephone line in correspondence with said predetermined data values.

18. An apparatus for serially generating groups of electrical pulses sequentially representing the ordinal places or digits of a predetermined number or other data for transmission on any one of a plurality of telephone lines, said apparatus comprising:

pulse generator means for cyclically and simultaneously producing a plurality of data outputs which are individually representative of corresponding possible individual data digit values, priority determining means connected to said pulse generator means, the state of which is incremented for each of said cyclic operations of said pulse generating means for producing sequential ordinal place signals representing sequential times for transmitting pulse trains where each pulse train represents an ordinal place of said predetermined number, and an output means for each of said telephone lines which is connected to said pulse generator means and to said priority determining means and which is preset in correspondence with said predetermined number to permit passage of predetermined particular pulse trains corresponding to predetermined ones of said data outputs in response to said ordinal place signals, thereby generating groups of pulses sequentially representing the digits of said predetermined number.

19. Pulse train generating and selection apparatus for use in a central telephone exchange which is connected to a plurality of subscribing telephone lines whereby successive digits or characters of predetermined data values that are associated with any particular subscriber's calling line may be automatically transmitted as corresponding successive electrical pulse trains to a connected called telephone line, said pulse train generating and selection apparatus comprising:

centralized pulse generating means for automatically and successively generating a plurality of data outputs representing all possible values of said predetermined data to be transmitted, and further means including a plurality of output units, each output unit being associated with one corresponding subscriber's telephone line and also being connected to said centralized pulse generating means, said further means automatically selecting and routing a particular predetermined sequence of pulse trains corresponding to predetermined ones of said data outputs and representing the predetermined data values to a selected called telephone line.

20. Transmitting apparatus for use in a central telephone exchange to transmit electrical pulses representing successive digits or characters of predetermined data values to a called telephone site, said transmitting apparatus comprising:

means for automatically and simultanteously generating a plurality of data outputs representing all possible data values to be transmitted, each data output corresponding to a separate channel, and further means including a plurality of output means connected to said first-mentioned means and corresponding to a like plurality of telephone lines in said central exchange, said further means automatically and successively routing selected pulse trains, which trains correspond to predetermined ones of said data outputs and to said successive digits or characters of the predetermined data values, to an appropriate called telephone line.

* * * * *